(12) United States Patent
Rehm

(10) Patent No.: US 11,884,491 B2
(45) Date of Patent: Jan. 30, 2024

(54) APPARATUS AND METHOD FOR THE SUSPENDED CONVEYANCE OF ITEMS

(71) Applicant: Dürkopp Fördertechnik GmbH, Bielefeld (DE)

(72) Inventor: Pascal Rehm, Bielefeld (DE)

(73) Assignee: Dürkopp Fördertechnik GmbH, Bielefeld (DE)

( * ) Notice: Subject to any disclaimer, the term of this patent is extended or adjusted under 35 U.S.C. 154(b) by 0 days.

(21) Appl. No.: 17/964,235

(22) Filed: Oct. 12, 2022

(65) Prior Publication Data

US 2023/0113233 A1  Apr. 13, 2023

(30) Foreign Application Priority Data

Oct. 13, 2021  (DE) ............... 10 2021 211 570.5

(51) Int. Cl.
 *B65G 17/20* (2006.01)
 *B65G 1/133* (2006.01)
 *B65G 1/137* (2006.01)

(52) U.S. Cl.
 CPC ............ *B65G 17/20* (2013.01); *B65G 1/133* (2013.01); *B65G 1/1376* (2013.01); *B65G 1/1378* (2013.01); *B65G 2203/0291* (2013.01)

(58) Field of Classification Search
 CPC .......... B65G 17/20; B65G 1/12; B65G 1/133; B65G 1/1376; B65G 2203/0291; B65G 1/1378; B65G 47/61
 See application file for complete search history.

(56) References Cited

U.S. PATENT DOCUMENTS

| 5,238,122 A * | 8/1993 | Hart ................. | B65G 1/137 |
| | | | 209/555 |
| 5,388,703 A * | 2/1995 | Schonenberger ...... | B65G 47/50 |
| | | | 198/465.4 |
| 10,358,291 B2 * | 7/2019 | Tai ................... | B65G 1/0457 |
| 11,186,437 B2 * | 11/2021 | Mathi ................ | B65G 47/44 |

(Continued)

FOREIGN PATENT DOCUMENTS

| DE | 29519354 U1 | 5/1996 |
| DE | 29709547 U1 | 8/1997 |

(Continued)

*Primary Examiner* — Mark A Deuble
(74) *Attorney, Agent, or Firm* — McGlew and Tuttle, P.C.

(57) ABSTRACT

An apparatus for the suspended conveyance of items includes a conveyor system which has a conveyor rail along which the items can each be conveyed suspended from an overhead adapter, and a plurality of buffer devices which are coupled to the conveyor system, which buffer devices are each designed as a circulating storage device, which buffer devices have a discharge conveyor, a separating unit arranged upstream of the discharge conveyor, an identification unit arranged downstream of the separating unit, and a diverter element arranged on the discharge line for discharging the overhead adapters, wherein the discharge conveyor is operable at a first conveying speed when no overhead adapter to be discharged has been identified, is operable at a second conveying speed when an overhead adapter to be discharged has been identified, wherein the second conveying speed is lower than the first conveying speed.

17 Claims, 1 Drawing Sheet

(56) References Cited

U.S. PATENT DOCUMENTS

| | | | | |
|---|---|---|---|---|
| 2006/0195221 A1* | 8/2006 | Tanaka | ................. | B65G 1/1373 |
| | | | | 700/214 |
| 2014/0303770 A1* | 10/2014 | Wend | ................... | B65G 1/1376 |
| | | | | 700/215 |
| 2018/0224839 A1* | 8/2018 | Takahara | ......... | G05B 19/41895 |
| 2019/0367277 A1 | 12/2019 | Sigrist | | |
| 2022/0073277 A1* | 3/2022 | Ueda | ................... | B65G 1/0492 |
| 2023/0183006 A1* | 6/2023 | Wolff | .................. | B65G 1/0485 |
| | | | | 700/216 |

FOREIGN PATENT DOCUMENTS

| | | | |
|---|---|---|---|
| DE | 102013206240 | A1 | 10/2014 |
| DE | 102018201676 | A1 | 8/2019 |

\* cited by examiner

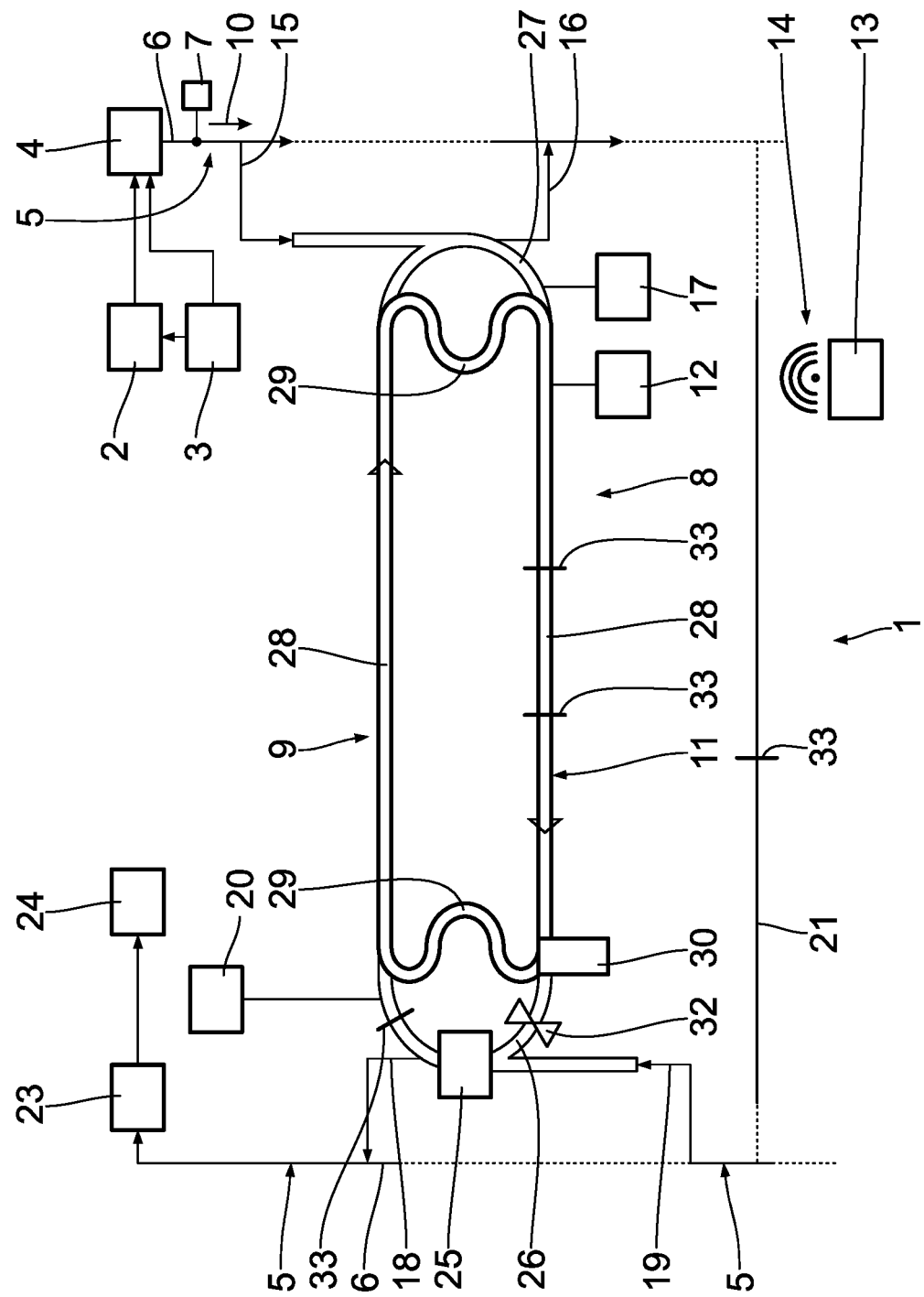

APPARATUS AND METHOD FOR THE SUSPENDED CONVEYANCE OF ITEMS

CROSS-REFERENCES TO RELATED APPLICATIONS

This application claims the priority of German Patent Application, Serial No. DE 10 2021 211 570.5, filed Oct. 13, 2021, the content of which is incorporated herein by reference in its entirety as if fully set forth herein.

FIELD OF THE INVENTION

The invention relates to an apparatus and method for the suspended conveyance of items.

BACKGROUND OF THE INVENTION

DE 10 2013 206 240 A1 discloses an overhead conveyor system with which individual goods are removed from a warehouse and temporarily stored in a plurality of buffer devices. The buffer devices are designed as circulating storage devices, which are linked to a common conveying installation. Individual goods that are commissioned to form an order are removed from the respective buffer device, collected in a collection zone, commissioned to form orders in a separation zone, and the commissioned orders are conveyed to an outgoing goods zone.

SUMMARY OF THE INVENTION

It is an object of the present invention to increase the conveying performance in an overhead conveyor system, in particular to reduce the dwell time of objects in a buffer device and/or to reduce the turnaround time of a buffer device.

This object is achieved by an apparatus for the suspended conveyance of items, wherein said apparatus comprises a conveyor system which has a conveyor rail along which the items can each be conveyed suspended from an overhead adapter, a plurality of buffer devices coupled to the conveying system, which buffer device each are designed as circulating storage devices having a closed circulating storage line and a conveyor, have a discharge conveyor for conveying overhead adapters along a discharge line of the buffer device, have a separating unit arranged upstream of the discharge conveyor for separating the overhead adapters, have an identification unit arranged downstream of the separating unit for identifying the items and/or overhead adapters to be discharged from the buffer device, have a diverter element arranged on the discharge line for discharging the overhead adapters to be discharged from the buffer device into the conveyor system, wherein the discharge conveyor is operable at a first conveying speed when no overhead adapter to be discharged has been identified, is operable at a second conveying speed when an overhead adapter to be discharged has been identified, wherein the second conveying speed is lower than the first conveying speed and by a method for the suspended conveyance of items comprising the method steps of conveying the items suspended from an overhead adapter along a conveyor rail of a conveyor system, feeding items into buffer devices, in particular by means of one feeding conveyor in each case, buffering the items in the buffer devices, each of which is designed as a circulating storage device with a closed circulating storage line, separating the items in the buffer device by means of a separating unit, conveying the separated items by means of the discharge conveyor along a discharge line of the buffer device, identifying the items and/or overhead adapters to be discharged from the buffer device by means of an identification unit arranged downstream of the separating unit, discharging the overhead adapters to be discharged from the buffer device into the conveyor system by means of a diverter element, wherein the discharge conveyor is operated at a first conveying speed when no overhead adapter to be discharged has been identified, wherein the discharge conveyor is operated at a second conveying speed when an overhead adapter to be discharged has been identified, wherein the second conveying speed is lower than the first conveying speed.

According to the invention, it has been recognized that the dwell time of items, each of which is conveyed in a suspended manner on an overhead adapter, in a buffer device designed as a circulating storage device can be reduced if the average conveying speed at which the items and/or the overhead adapters are conveyed in the buffer device is increased. The turnaround time for each buffer device can thus be reduced. The turnaround time is understood to mean the time required by a buffer device to handle all the items and/or overhead adapters stored in it once, i.e. in particular until an item and/or overhead adapter is identified for the second time in this buffer device.

In particular, a plurality of buffer devices are provided and arranged independently of one another in such a way that the items and/or overhead adapters of one buffer device can be discharged from the buffer device independently of those of another buffer device, i.e. removed from storage or discharged. In order to allow particularly high turnaround rates, i.e. in particular short turnaround times in the buffer devices, the circulating storage device has, in addition to a temporary storage conveyor, a discharge conveyor which is coupled to the latter in terms of conveying technology but designed separately therefrom and which conveys the items and/or overhead adapters along a discharge line. This conveyance along the discharge line is performed at a first conveying speed, which is in particular a maximum conveying speed. In order to ensure a reliable and collision-free discharge of items and/or overhead adapters from the buffer device, the discharge conveyor can be operated at a second conveying speed which is lower than the first conveying speed.

It is therefore essential that the discharge conveyor can be operated at a variably adjustable conveying speed, wherein in particular only one first and only one second conveying speed are required. The second conveying speed is limited in particular by the distance along the discharge line which an item and/or overhead adapter to be discharged travels from an identification unit to a diverter element at which the item and/or overhead adapter is discharged.

In principle, it is also possible to operate the discharge conveyor at more than two different conveying speeds in order to increase the variability in the conveying flow.

According to the invention, each buffer device has at least two separate conveyors.

According to the invention, it is possible to adjust the conveying speed along the circulating storage line variably in sections in order to ensure that goods flow out of the respective buffer device. In this way, the conveying performance of the respective buffer devices and thus the conveying performance of the apparatus and, in particular, of the overhead conveyor system as a whole can be increased.

One finding of the invention is based on the fact that it is advantageous if the buffer devices are each operated in sections at different conveying speeds. The items are withdrawn from the buffer device, i.e. discharged, at the respective second conveying speed of the discharge conveyor. The items in the other buffer devices can be handled at the first conveying speed. This results in a correspondingly increased conveying speed in the other buffer devices, in particular for the items remaining in them.

According to the invention, it is possible to increase the turnaround performance in the buffer devices to at least 10,000 items per hour, in particular to at least 12,000 items per hour, in particular to at least 14,000 items per hour and in particular to at least 15,000 items per hour. This results in a reduced access time to the individual items. Additionally or alternatively, it is possible to reduce the number of buffer devices in the apparatus while maintaining the same access time, resulting in potential savings in terms of investment and space requirements. A device of this type is cost-saving and economically advantageous.

Items within the meaning of the invention are hanging goods, in particular clothing, which are conveyed in a suspended manner, for example with a clothes hanger on a respective overhead adapter. An item may also be a so-called lying product which can be transported in a conveyor bag which is conveyed in a suspended manner on the overhead adapter. Such a conveyor bag and a corresponding overhead adapter are known from DE 10 2018 201 676 A1. With regard to details of the design of the conveyor bag and the overhead adapter, express reference is made to this.

The apparatus has a plurality of buffer devices, in particular at least five, in particular at least ten, in particular at least twenty, in particular at least thirty, in particular at least fifty, and in particular up to one hundred. Fewer than five buffer devices may also be provided. The buffer devices are each designed as circulating storage devices with a closed circulating storage line.

In particular, each buffer device has a separating unit arranged along the circulating storage line, in particular at a transition point of the temporary storage conveyor to the discharge conveyor. The separating unit serves to separate the items for the discharge conveyor and in particular for the identification unit arranged in the region of the discharge conveyor. By separating the items and/or overhead adapters, they can be reliably identified by the identification unit located downstream of the separating unit.

The identification unit has, in particular, a reading device that is suitable for reading an identification means for identifying the items. The identification means is in particular attached to the overhead adapter or arranged integrated in the overhead adapter. The identification means is in particular an optically readable code, in particular a bar code or a QR code, or an electronic memory chip, in particular an RFID chip. Accordingly, the identification unit is designed as a code reader or chip reader. In particular, the identification unit enables contactless collection of data linked to the identification means or stored therein. In particular, the identification unit is arranged upstream of the separating unit. In particular, it is possible to determine the conveying speed for the discharge conveyor in dependence on the data read out by means of the identification unit.

It has been found that the variable setting of the conveying speeds on the discharge conveyor is particularly advantageous if the discharge rate is relatively low and in particular is at most 50%, in particular at most 30%, in particular at most 20%, in particular at most 10%, in particular at most 8%, in particular at most 6%, in particular at most 5%, in particular at most 3%, in particular at most 1% and in particular at least 0.1%. The discharge rate is understood to mean the proportion of items to be discharged relative to all items in this buffer device.

The invention thus relates in particular to buffer devices whose items and/or overhead adapters have a low probability of being discharged at the diverter element. The diverter element constitutes a so-called turnover point. It has been found that the conveying rate, i.e. the number of conveyed items and/or overhead adapters with the discharge conveyor is limiting with respect to the conveying rate of the buffer device. It has also been found that it is advantageous for the conveying rate of the buffer device and thus for its turnaround time to increase the conveying rate in this region and, in particular, to execute it independently of the conveying rate of the temporary storage conveyor.

An apparatus comprising a feeding conveyor of the buffer device for feeding items and/or overhead adapters simplifies the feeding of items into the buffer devices. In particular, a feeding conveyor is configured similarly and in particular identically to the discharge conveyor. The structure of the feeding conveyor can be simplified compared to that of the discharge conveyor. In particular, it is not necessary to design the feeding conveyor with conveying speeds that can be set differently. It is sufficient if the feeding conveyor operates at one, in particular constant, conveying speed. In principle, it is also conceivable that the feeding conveyor is of passive design, i.e. the items and/or overhead adapters are fed to the buffer device, for example, via an inclined conveyor rail, i.e. in the sense of a gravimetric drive.

An apparatus in which the identification unit is arranged in the region of the discharge conveyor enables reliable identification of the items to be discharged. In particular, the identification unit is arranged downstream of the separating unit, so that the separated items transported at the required transport spacing from one another are guided past the identification unit. The identification unit is arranged in particular in the region of the discharge conveyor and in particular along the discharge line. The identification unit is arranged in particular upstream of the diverter element and in particular adjacent to the diverter element. The shorter the distance along the discharge line between the identification unit and the diverter element, the shorter the time interval within which the first conveying speed must be reduced to the second conveying speed in order to discharge an item. The time interval in which the buffer device is operated at the second conveying speed is reduced. The integral conveying rate of the system is thus increased.

An apparatus comprising a control unit which is in signal connection, in particular bidirectional, with the feeding conveyor, the discharge conveyor and/or the temporary storage conveyor simplifies the adjustment of the conveying speed of the discharge conveyor. In particular, an automated and in particular controlled adjustment of the conveying speed is made possible.

An apparatus comprising an incoming goods zone in which items are fed to the apparatus, at least one feed station, at which the items are fed into the apparatus by means of conveying technology, at least one sorting unit by means of which the order of the items can be changed, at least one packing station at which the items are packed into orders and an outgoing goods zone, at which items combined into orders are discharged from the apparatus enables a continuous and, in particular, automated handling of a flow of goods in an overhead conveyor system.

An apparatus in which the conveyor system is coupled to the individual buffer devices in terms of conveying technology in each case by means of a feeding line and a discharge line enables a decoupled feeding and discharging of items and/or overhead adapters into and out of the buffer device. In particular, each buffer device is coupled to the conveyor mechanism of the overhead conveyor system by a separate feeding line and a separate discharge line. The feeding line and/or the discharge line may each have their own conveyors.

A method as described above substantially has the advantages of the apparatus, reference to which is hereby made.

A method in which the identification unit is signal-coupled to the separating unit ensures the reliable identification of the items in the buffer device.

A method comprising controlled conveyance of the items by means of a control unit which is in signal connection, in particular bidirectional, in particular with the feeding conveyor, the discharge conveyor and/or the temporary storage conveyor, in particular speed-controlled discharge of the items from the buffer devices enables an automated, in particular reliable, increase of the integral conveying performance of the apparatus.

Both the features indicated in the patent claims and the features indicated in the following embodiment of an apparatus according to the invention are in each case suitable, alone or in combination with one another, for further forming the subject matter according to the invention. The respective combinations of features do not represent any restriction with respect to the further embodiments of the subject matter of the invention, but are essentially merely exemplary in character.

Additional features, advantageous designs and details of the invention will be apparent from the following description of an embodiment example based on the drawing.

BRIEF DESCRIPTION OF THE DRAWING

FIG. 1 shows a schematized illustration of an apparatus according to the invention having a plurality of buffer devices.

DESCRIPTION OF THE PREFERRED EMBODIMENT

An apparatus shown purely schematically in FIG. 1 and marked as a whole with 1 serves for the suspended conveyance of items. The apparatus 1 is in particular an overhead conveyor. The items are also referred to as individual goods. The items, which are not shown in more detail, are conveyed along the apparatus 1 on overhead adapters 33, which are shown purely schematically.

The apparatus 1 comprises a warehouse 2 in which the items are stored. The warehouse 2 can be designed as a manual warehouse or as an automatic warehouse. The apparatus 1 further has an incoming goods zone 3, via which the items are fed to the apparatus 1, in particular from an external source. Returned goods can also be fed to the incoming goods zone 3. The incoming goods zone 3 is linked to the warehouse 2 by means of a conveying mechanism. The conveyor connection is implemented, for example, by a conveyor belt or by manual feeding of the items, which in particular can also be present in packages in the incoming goods zone 3.

The apparatus 1 further comprises a feed station 4, at which the items are fed into a conveyor bag, for example. In particular, exactly one item is fed into a conveyor bag. The conveyor bags are therefore each loaded with one item. The feed station 4 is also referred to as the loading station. The items that are loaded into the conveyor bags are also referred to as lying goods. The lying goods are conveyed by means of the conveyor bags in the apparatus 1 on the overhead adapters 33. Additionally or alternatively, so-called hanging goods can also be fed to the feed station 4. Hanging goods are, for example, an item that is conveyed by means of an overhead adapter 33, in particular suspended from a clothes hanger, in particular clothing.

The feed station 4 is connected to the incoming goods zone 3 by a conveying mechanism. It is therefore possible to convey items from the incoming goods zone 3 directly to the feed station 4. In particular, the feed station 4 is also connected to the warehouse 2 by a conveying mechanism. Items can be conveyed from warehouse 2 directly to feed station 4.

It is possible that there is no conveyor connection between the feed station 4 and the incoming goods zone 3 or between the feed station 4 and the warehouse 2. In this case, the items are conveyed manually from the warehouse 2 or the incoming goods zone 3 to the feed station 4, for example by means of spring floor trolleys or pallet lifting trucks. In the apparatus 1, the conveyor bags and/or the clothes hangers are conveyed one at a time, suspended from the overhead adapters 33. A conveyor system 5 is used for this purpose, which has a conveyor rail 6 and, in particular, a conveyor drive 7.

The items are each assigned an identification means, which is in particular arranged at the overhead adapter 33 or configured to be integrated in the overhead adapter 33. The identification means can be a data chip, in particular an RFID chip, or an identification code, in particular a bar code or a QR code. Unique identification data is stored in the respective identification means. The identification data is also referred to as overhead adapter data By means of the identification data, the respective overhead adapter 33 with the item conveyed suspended therefrom can be uniquely identified. In particular, the conveying path of the item in the apparatus 1 can be controlled. In particular, it is possible to track and control the conveying path of the items in an individualized manner along the apparatus 1. For this purpose, the apparatus 1 has a plurality of identification units, which are arranged in particular at branching points of the apparatus 1 upstream.

For suspended conveyance, the items are each connected to an overhead adapter 33 by means of the conveyor bags and/or the clothes hangers in a form-fitting manner. In particular, the conveyor bags and/or the clothes hangers each have a hook which can be fastened in a corresponding recess of the overhead adapter 33. Alternatively, the overhead adapter 33 can also be hook-shaped and, in particular, be fastened in a recess of the conveyor bag and/or the clothes hanger.

The apparatus 1 comprises a sorting unit 8 for sorting the items, i.e. for changing the sequence of the items in the flow of goods, which starts in particular from the feed station 4. The sorting unit 8 has a number of buffer devices 9, although only one buffer device 9 is shown in FIG. 1 for reasons of illustration. The buffer devices 9 are arranged one behind the other, i.e. in series, along a conveying direction 10 of the conveyor system 5. It is also possible to arrange the buffer devices 9 parallel to each other along the conveying direction 10. In this case, the buffer devices 9 are connected to the feed station 4 independently of one another.

In particular, the apparatus 1 has at least five, in particular at least ten, in particular at least fifteen, in particular at least twenty, in particular at least thirty, in particular at least forty, and in particular at least fifty buffer devices 9. The sorting unit 8 and, in particular, the buffer devices 9 are connected to the feed station 4 via the conveyor system 5 in terms of conveying technology.

The sorting unit 8 and in particular the buffer devices 9 serve in particular to combine the items into logical groups. In particular, the items are combined into groups of items that form an order. In the sorting unit 8, groups of items can be formed that are part of an order.

The buffer devices 9 are each designed as circulating storage devices with a closed circulating storage line 11 and with a temporary storage conveyor 12 for conveying the items along the circulating storage line 11.

The circulating storage line 11 has two linear sections 28, each of which is connected at its ends to the beginning of the other linear section 28 via connecting sections 29. The linear sections 28 and the connecting sections 29 are each arranged alternately along the conveying direction of the circulating storage line 11. The linear sections 28 and the connecting sections 29 form the circulating storage line 11, which is in particular closed in itself. The circulating storage line 11 enables the items in the buffer device 9 to be conveyed in an endless, circular manner. The buffer device 9 is also referred to as a circular storage device or an endless conveyor. The intermediate storage conveyor 12 has an endless circulating drive chain. The drive chain is not shown in FIG. 1 and extends along the linear sections 28 and the connecting sections 29.

The apparatus 1 includes a central control unit 13, which enables a signal connection with other components of the apparatus 1. The signal connection can be wired or wireless. A wireless, radio-linked signal connection is shown in FIG. 1 with a symbol 14 for radio transmission.

The conveyor system 5 is coupled to one of the buffer devices 9 in terms of conveying technology by means of a feeding coupling line 15 in each case. In particular, each buffer device 9 is coupled to the conveyor system 5 and in particular to the conveyor rail 6 by means of exactly one feeding coupling line 15. Items and/or overhead adapters 33 that are to be fed to a buffer device 9 are discharged from the conveyor system 5 via the feeding coupling line 15 and fed to the respective buffer device 9.

It is also conceivable in principle that a plurality of buffer devices 9 are connected to the conveyor system 5 via a common coupling line and/or that a plurality of buffer devices are connected directly to the conveyor system 5. In this case, the conveyor system 5 forms a common head conveyor for the buffer devices 9.

The feeding coupling line 15 is coupled to a feeding line 27 by means of conveying technology. The feeding line 27 is connected to a feeding conveyor 17 which ensures feeding of the items and/or overhead adapters 33 into the buffer device 9, in particular into the circulating storage line 11.

It is understood that the conveyor system 5 and in particular the conveyor rail 6 is continued downstream of the conveying direction 10 with respect to the feeding coupling line 15, in particular to enable coupling of various buffer devices 9. In particular, it can be provided that the feeding line 27 is linked to the conveyor system 5 via a return coupling line 16, i.e. is returned.

The buffer device 9 has a discharge line 26 with a discharge conveyor 20, wherein a discharge coupling line 18 is coupled to the discharge line 26. The buffer device 9 is coupled to the conveyor system 5 of the apparatus 1, in particular to a further conveyor rail 6, via the discharge coupling line 18.

The discharge line 26 and the feeding line 27 are each substantially U-shaped and each connect the end of one linear section 28 to the beginning of the other linear section 28. The two U-shaped lines 26 and 27 and the linear sections 28 arranged therebetween form an elongated circulating storage device.

In particular, it is possible for the conveyor system 5 to be coupled to the buffer device 9 in terms of conveying technology via an additional feeding coupling line 19 in the region of the discharge line 26. It is therefore possible, in particular, that items and/or overhead adapters 33 are stored in the buffer device 9 via this additional feeding coupling line 19.

The feeding coupling line 15 and the discharge coupling line 18 are spaced apart along the respective circulating storage line 11 and, in particular, are coupled to the buffer devices 9 in terms of conveying technology opposite one another.

The temporary storage conveyor 12, the feeding conveyor 17 and the discharge conveyor 20 are designed independently of each other and are each directly connected to a section of the line. The discharge line 26, the circulating storage line 11 and the feeding line 27 are coupled to each other in terms of conveying technology. The items and/or overhead adapters 33 conveyed in the buffer device 9 in a circulating manner can be transferred from the one conveying line to the downstream following conveying line, wherein within the respective conveying line 11, 26, 27 the conveyance is performed by means of the conveyor existing there in each case, i.e. by means of the conveying speed realized by the respective conveyor 11, 17, 20.

In particular, it is possible for the sections of the conveyor system 5 arranged opposite one another with respect to the buffer devices 9 to be directly coupled by a return conveyor line 21 in terms of conveying technology. A plurality of return conveyor lines 21 may also be provided, in particular one return conveyor line 21 each between two adjacently arranged buffer devices 9. In particular, the return conveying lines allow the buffer devices 9 to be bypassed, i.e., items and/or overhead adapters 33 can be conveyed directly past the sorting unit and in particular past the buffer devices. The conveying rate is increased as a result.

The sorting unit 8 is connected to at least one packing station 23 in terms of conveying technology by means of the conveyor system 5. The at least one packing station 23 is also referred to as a packing place. In particular, the apparatus 1 has a plurality of packing places 23, in particular at least five, at least ten, in particular at least twenty, and in particular at least fifty packing places 23. At the packing places 23, the items are unloaded, that is, removed from the conveyor bags and/or the clothes hangers are removed from the overhead adapters 33 and packed, in particular manually. In particular, the items are packed into single orders. At the packing station 23, the items are packed to form orders. In FIG. 1, only one packing station 23 is shown for reasons of illustration. The apparatus 1 may have a plurality of packing stations 23, in particular at least five, in particular at least ten, and in particular up to one hundred packing stations 23. The packing stations 23 can be arranged in parallel and/or in series with one another along the conveying direction. An outgoing goods zone 24 is coupled to the packing stations 23 in terms of conveying technology, at which outgoing goods zone 24 the items combined to form orders are discharged from the apparatus 1.

The structure and function of the buffer devices 9 are explained in more detail below. The buffer devices 9 are identical in design, which is why the following explanation is representative for one of the buffer devices 9.

In particular, the feeding coupling line 15 is directly coupled in terms of conveying technology with the feeding line 27. In particular, in the event that the return coupling line 16 is connected to the feeding line 27 downstream of the buffer device 9, an insertion element no longer shown in FIG. 1 can be arranged in the region of the feeding line 27 in order to insert items and/or overhead adapters 23 which are to be stored in the buffer device 9.

A diverter element 25 is arranged, in particular centrally, at the discharge line 26. The diverter element 25 serves to discharge items and/or overhead adapters 33 from the buffer device 9, in particular via the discharge coupling line 18 into the conveying system 5. Depending on a respective switch position of the diverter element 25, the items and/or overhead adapters 33 are conveyed along the discharge line 26, i.e., in a semicircular manner from one linear section 28 to the opposite linear section 28, or are discharged from the discharge line 26 onto the discharge coupling line 18, from the buffer device 9. In the former case, therefore, the item or the overhead adapter 33 is conveyed in a circulating manner in the buffer device 9.

Along the conveying system 5, in particular, a plurality of conveyor line identification units 34 are arranged. The conveyor line identification units 34 enable the identification of the overhead adapters 33 for feeding overhead adapters 33 into the buffer devices 9.

The discharge line 26 and the feeding line 27 each couple to connecting points between a linear section 28 and a connecting section 29.

The buffer device 9 has a separating unit 30. The separating unit 30 is arranged in each case in the region of the end of a linear section 28 at the circulating storage line 11. The separating unit 30 is arranged in front of the discharge line 26, i.e. upstream of the discharge line 26.

Downstream of the separating unit 30, an identification unit 32 is arranged, in particular at the discharge line 26, i.e. in the region of the discharge conveyor 20. The identification unit 32 serves to identify the items, in particular by means of the identification means of the overhead adapters 33. In particular, the identification unit 32 can identify those items and/or overhead adapters 33 which are to be discharged from the buffer device 9. The identification unit 32 is arranged upstream of the diverter element 25.

In particular, the control unit 13 is in signal connection, in particular in bidirectional signal connection, with the feeding conveyor 17, the discharge conveyor 20, with the separating unit 30, with the diverter element 25 and/or with the identification unit 32.

A method for the conveyance of items in the apparatus 1 is explained in more detail below with reference to FIG. 1.

Items are loaded from the warehouse 2 and/or incoming goods zone 3 at the feed station 4 into conveyor bags and/or suspended from hangers at the overhead adapters 33. From the feed station 4, the items are conveyed along the conveying system 5.

For sorting and in particular for picking the items to form orders, the items are temporarily stored and/or sorted in the buffer devices 9. For this purpose, the overhead adapters 33 are identified by means of the identification units, in particular by means of the conveyor line identification units 34 along the first conveying system 5 and fed to one of the buffer devices 9.

The item is conveyed in the buffer device 9, in particular several times in a circulating manner, until the item is requested to form an order at one of the packing stations 23.

An item is separated at the separating unit 30, transferred from the linear section 28 to the discharge line 26 and identified by means of the identification unit 32. When the identified item is to be discharged from the buffer device 9, a corresponding signal is transmitted to the control unit 13 and from there to the diverter element 25. It is also conceivable that the signal is transmitted from the identification unit 32 to the diverter element 25. When the identified item passes the diverter element 25, the diverter element 25 is displaced into a corresponding discharge position in order to discharge the item from the buffer device 9, in particular via the discharge coupling line 18, into the conveying system 5.

In this context, it is essential that the discharge line 26 has its own separate discharge conveyor 20. Whenever no item is to be discharged from the buffer device 9, the separated overhead adapters 33 can be conveyed along the discharge line 26 at a first conveying speed, which is in particular at a maximum. In particular, the first conveying speed $v_1$ is limited only by the drive power of the discharge conveyor 20. In this state, the items and/or overhead adapters 33 are conveyed along the discharge line 26 at a high conveying rate, i.e. transferred from one linear section 28 to the other linear section 28.

Once an item to be discharged has been identified, the discharge conveyor 20 is operated at a reduced, second conveying speed $v_2$. The second conveying speed $v_2$ ensures that the reaction time of the diverter element 25 is sufficient to discharge the item from the buffer device 9. In particular, the second conveying speed results from the reaction time of the diverter element and the conveying distance of the overhead adapters 33 which is provided by the separating unit 30. It is essential that the second conveying speed $v_2$ is lower than the first conveying speed $v_1$.

It has turned out in particular that a method is advantageous in which a minimum conveying distance of the overhead adapters 33 is identified. This minimum conveying distance between two overhead adapters 33 depends in particular on the conveying speed. The conveying speed, in particular in the region of the separating unit 30, is in particular between 100 mm/s and 800 mm/s, in particular between 250 mm/s and 500 mm/s. A transport spacing of adjacent overhead adapters 33 is in particular between 100 mm and 200 mm and in particular between 120 mm and 180 mm.

It has been found that, depending on whether an overhead adapter 33 is to be discharged from the buffer device 9, the conveying speed of the discharge conveyor 20, i.e. the conveying speed at which the items are withdrawn from the buffer devices 9, can be set variably. In particular, the conveying speed is reduced in such a way that a safe and collision-free discharge of the item can take place by means of the diverter element 25. This reduction of the conveying speed is achieved by means of the temporary storage conveyor 12.

If, by means of the identification unit 32, items are identified that are not due for discharge, i.e. that are to remain in the buffer device 9 and be conveyed in circulation, the conveying speed of the temporary storage conveyor is increased again, in particular to a maximum value. This allows the turnaround performance in the buffer device 9 to be increased.

The minimum conveying distance between the identification unit 32 and the diverter element 25 is determined by the processing speed of the reading signal, the maximum conveying speed and an acceptable delay to decelerate from the maximum to the reduced conveying speed, avoiding in particular a strong swaying movement of the items at the overhead adapters 33.

What is claimed is:

1. An apparatus for the suspended conveyance of items, wherein said apparatus comprises a. a conveyor system which has a conveyor rail along which the items can each be conveyed suspended from an overhead adapter,
b. a plurality of buffer devices coupled to the conveying system, which buffer device each
   i. are designed as circulating storage devices having a closed circulating storage line and a conveyor,
   ii. have a discharge conveyor for conveying overhead adapters along a discharge line of the buffer device,
   iii. have a separating unit arranged upstream of the discharge conveyor for separating the overhead adapters,
   iv. have an identification unit arranged downstream of the separating unit for identifying at least one of the group comprising the items and overhead adapters to be discharged from the buffer device,
   v. have a diverter element arranged on the discharge line for discharging the overhead adapters to be discharged from the buffer device into the conveyor system,
   wherein the discharge conveyor
      is operable at a first conveying speed when no overhead adapter to be discharged has been identified,
      is operable at a second conveying speed when an overhead adapter to be discharged has been identified,
   wherein the second conveying speed is lower than the first conveying speed.

2. The apparatus according to claim 1, comprising a feeding conveyor of the buffer device for feeding at least one of the group comprising items and overhead adapters.

3. The apparatus according to claim 1, wherein the identification unit is arranged in the region of the discharge conveyor.

4. The apparatus according to claim 1, comprising a control unit which is in signal connection with at least one of the group comprising the feeding conveyor, the discharge conveyor and the temporary storage conveyor.

5. The apparatus according to claim 4, wherein the signal connection of the control unit is bidirectional.

6. The apparatus according to claim 1, comprising an incoming goods zone in which items are fed to the apparatus.

7. The apparatus according to claim 1, comprising at least one feed station, at which the items are fed into the apparatus by means of conveying technology.

8. The apparatus according to claim 1, comprising at least one sorting unit by means of which the order of the items can be changed.

9. The apparatus according to claim 1, comprising at least one packing station at which the items are packed into orders.

10. The apparatus according to claim 1, comprising an outgoing goods zone, at which items combined into orders are discharged from the apparatus.

11. The apparatus according to claim 1, wherein the conveyor system is coupled to the individual buffer devices in terms of conveying technology in each case by means of a feeding line and a discharge line.

12. A method for the suspended conveyance of items comprising the method steps of
    conveying the items suspended from an overhead adapter along a conveyor rail of a conveyor system,
    feeding items into buffer devices,
    buffering the items in the buffer devices, each of which is designed as a circulating storage device with a closed circulating storage line,
    separating the items in the buffer device by means of a separating unit,
    conveying the separated items by means of the discharge conveyor along a discharge line of the buffer device,
    identifying at least one of the group comprising the items and overhead adapters to be discharged from the buffer device by means of an identification unit arranged downstream of the separating unit,
    discharging the overhead adapters to be discharged from the buffer device into the conveyor system by means of a diverter element,
    wherein the discharge conveyor is operated at a first conveying speed when no overhead adapter to be discharged has been identified,
    wherein the discharge conveyor is operated at a second conveying speed when an overhead adapter to be discharged has been identified, wherein the second conveying speed is lower than the first conveying speed.

13. The method according to claim 12, wherein the feeding of items into the buffer devices is performed by means of one feeding conveyor in each case.

14. The method according to claim 12, wherein the identification unit is signal-coupled to the separating unit.

15. The method according to claim 12, comprising controlled conveyance of the items by means of a control unit which is in signal connection with at least one of the group comprising the feeding conveyor, the discharge conveyor and the temporary storage conveyor.

16. The method according to claim 15, wherein the signal connection is bidirectional.

17. The method according to claim 12, comprising speed-controlled discharge of the items from the buffer devices.

* * * * *